United States Patent [19]

Audion et al.

[11] Patent Number: 5,071,226
[45] Date of Patent: Dec. 10, 1991

[54] AIRBORNE OPTOELECTRONIC SYSTEM FOR IDENTIFICATION AND LOCALIZATION WITH COMPENSATED AND FACETTED PORT

[75] Inventors: Marc Audion, Massy; Christian Pepin, Gif S/Yvette, both of France

[73] Assignee: Thomson-CSF, Puteaux, France

[21] Appl. No.: 621,808

[22] Filed: Dec. 4, 1990

[30] Foreign Application Priority Data

Dec. 15, 1989 [FR] France .................. 89 16615

[51] Int. Cl.⁵ .................. G02B 5/06; G01B 11/26; G01C 3/00
[52] U.S. Cl. ................................ 359/832; 356/152; 250/203.6
[58] Field of Search ............... 350/286, 287; 250/203.6, 206.1, 206.2; 356/152

[56] References Cited

U.S. PATENT DOCUMENTS 3,514,192  5/1970  De La Cierva ............. 350/286
4,614,405  9/1986  Brandenberg et al. .

FOREIGN PATENT DOCUMENTS 2104237  3/1983  United Kingdom .

*Primary Examiner*—Jon W. Henry
*Attorney, Agent, or Firm*—Oblon, Spivak, McClelland, Maier & Neustadt

[57] ABSTRACT

Disclosed is an airborne optoelectronic system using a facetted port. There is provision for compensation means in the form of two prisms with variable index, each formed by a lateral facet and a second facet forming a cavity, within which the refractive index is adjusted by the control of the internal gas pressure. The variation in the pressure with the cavity is achieved by following a control point value depending notably on the altitude of the carrier and the orientation of the line of sight. This results in eliminating the doubling of the image which occurs when there is no compensation when the altitude of the carrier varies and when the incident flux is distributed among the facets. The disclosed device can be applied to optoelectronic systems for warplanes, the flight altitudes of which may vary widely.

6 Claims, 3 Drawing Sheets

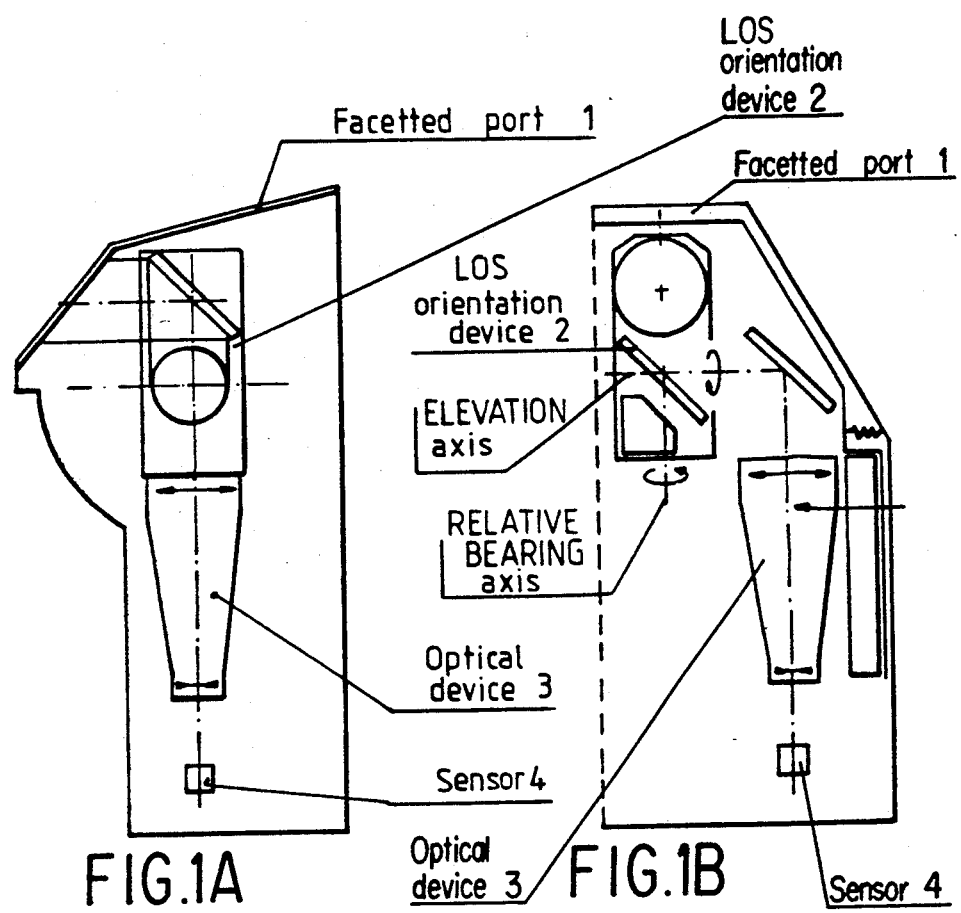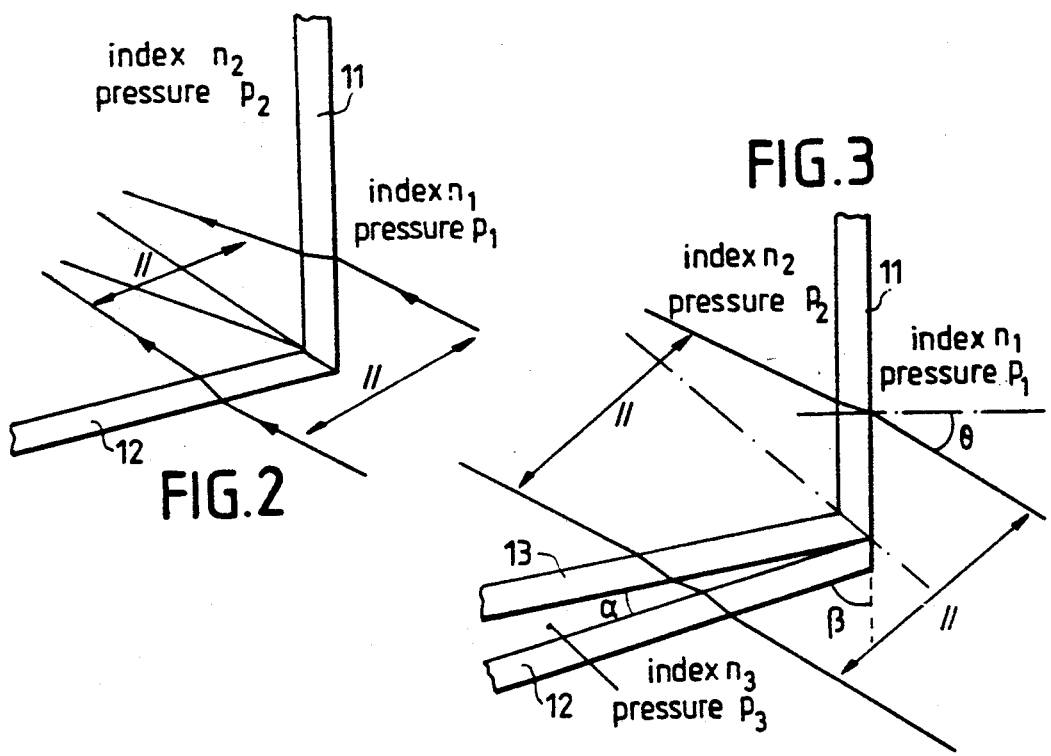

AIRBORNE OPTOELECTRONIC SYSTEM FOR IDENTIFICATION AND LOCALIZATION WITH COMPENSATED AND FACETTED PORT

BACKGROUND OF THE INVENTION

1. Field of the Invention

The invention relates to the field of airborne optoelectronic systems, notably placed on board military aircraft for 3D identification and localization and, more particularly, to systems of this type having facetted ports.

2. Description of the Prior Art

Conventionally, an optoelectronic system for 3D identification and/or localization is used in a warplane. This system has a port for shielding the camera constituted by an optical device associated with an optical sensor and means for processing the signal that comes from the sensor. This port may take various forms, according to requirements: it may be spherical, plane or facetted, i.e. formed by the juxtaposition of planes that are inclined with respect to one another.

The spherical shape is generally used for its aerodynamic profile and because it permits a wide range of deflection of the line of sight (LOS). Moreover, this shape has the advantage of high resistance to aerodynamic pressures. However, owing to its refractive power, a spherical port has to be fixedly joined to the optical assembly of the camera. The optical axis of the port should remain aligned with that of the optical device of the optoelectronic system, irrespectively of the mechanical and climatic environment, so as not to reduce the image quality. A spherical port such as this is not appropriate when the mechanical constraints dictate an off-axis line of sight.

A plane port circumvents this drawback. In particular, it enables the camera to be suspended from the port-bearing structure. The need to suspend the camera is related to the mechanical environment. For, this camera is generally associated with a line-of-sight orienting device that is stabilized with respect to the ground-related reference in order to obtain an image of the external scene that is "stable" for the pilot's eyes in the case of airborne systems. The plane port has no refractive power and, consequently, it is neutral and enables a shifting of the orientation device in relation to the port without affecting the image quality. However, the plane port has the drawback of restricting the range of deflection of the line of sight for two main reasons related to the necessary restriction of the size of the plane port, firstly because of aerodynamic considerations and, secondly, because of the Brewster limit angle.

A standard approach used to increase the angles of deflection with a plane port consists in making the port movable about one or two rotational axes, by means of a follower cap:

With a "single-axis" follower cap, the plane port maintains a constant angle with the direction of the line of sight when the latter undergoes a rotation about an axis. The device for orienting the line of sight is generally movable about two orthogonal axes (elevation and relative bearing). The "single-axis" follower cap consequently permits a major angular deflection of the line of sight about a single axis while at the same time enabling the optical field to permanently go through a single plane port. By contrast, the angular deflection of the line of sight along the other axis is more restricted.

With a "dual-axis" follower cap, the plane port is borne, this time, by a structure that is movable in two rotational axes (elevation and relative bearing) enabling the optical field to permanently go through a single plane port, irrespectively of the direction of the line of sight. This permits great angular deflections along both axes (elevation and relative bearing).

The follower cap is a movable port that in no way modifies the principle and the structure of the device for orienting the line of sight of the optoelectronic system. This system remains shielded from aerodynamic effects by the "follower" port. This is very important for the quality of stabilization of the line of sight. However, another approach has the plane port borne by the line-of-sight orientation device. This has the advantage of reducing size of the driving system (the number of motors to be automatically controlled) and the amount of space occupied when the stabilization performance characteristics do not have priority and may be of lower quality.

These devices do not provide for associating simplicity, space factor and performance characteristics, all at the same time. The follower caps require:

an inherent automatic control device (fulfilling the driving, control and copying functions).

a greater space factor with an increase in the coefficient of penetration in air, conditions of imperviousness, compatible with the rotation, which are generally costly given that the optoelectronic systems require a stable pressurization irrespectively of the external environment.

The borne caps are generally not suited to airborne systems either, given the performance characteristics, and they require a tight-sealing device as do the preceding ones.

The facetted shape makes it possible to combine the advantages of the two previous shapes (spherical and plane) without having their drawbacks (namely the need to maintain imperviousness in rotation and the need for an automatically controlled driving system), while preserving the advantages of the fixed port, for a system with high angular deflection. It permits:

wide angles of deflection of the line of sight;

the suspension of the assembly formed by the line-of-sight orientation device, the optical device and the sensor.

By contrast, the facetted shape has the drawback, for a port of an airborne optoelectronic system, of doubling the image of the target to be identified at high altitude, in doing so when the field of the camera intercepts an juncture between two facets. Furthermore, when a telemeter is used for the 3D localization, the divergence of the laser beam is also increased under the same conditions: this affects the range performance characteristics of the system.

This doubling phenomenon is called the "dihedron effect" and is due to the difference between the refractive indices of the gases on either side of the port, prompted by the difference in pressure between the interior of the system and the exterior: the interior of the system must be kept at a constant pressure so that it does not modify the characteristics of the optical device while the exterior of the port undergoes the variations in atmospheric pressure with altitude.

SUMMARY OF THE INVENTION

An object of the invention is a high-resolution optoelectronic system enabling:

wide angles of deflection of the line of sight, suspension of the optical bank, in using a facetted and compensated port to eliminate the dihedron effect while at the same time preserving constant pressure within the optical device and preserving the optical qualities of the system.

Furthermore, the device for implementing the object of the invention does not need to be laid out in any particular position: this makes the designing of the assembly more flexible.

According to the invention, there is proposed an airborne optoelectronic identification and/or localization system comprising a facetted port, a line-of-sight orientation device and an optical device for the forming of images of the viewed field, wherein said system further includes compensation means to bring the flux emerging from a lateral facet of the port and the flux emerging from the front facet in a parallel condition inside the line-of-sight orientation device.

BRIEF DESCRIPTION OF THE DRAWINGS

The invention will be understood more clearly and other characteristics will become apparent from the following description, made with reference to the appended figures, of which:

FIG. 1 shows a schematic view, along two sectional planes, of an optoelectronic system with facetted port;

FIG. 2 illustrates the dihedron effect on a parallel beam incident to the facetted port;

FIG. 3 shows a facetted port according to a first variant of the invention, compensated by variable index prisms;

DESCRIPTION OF PREFERRED EMBODIMENTS

Figure 4:
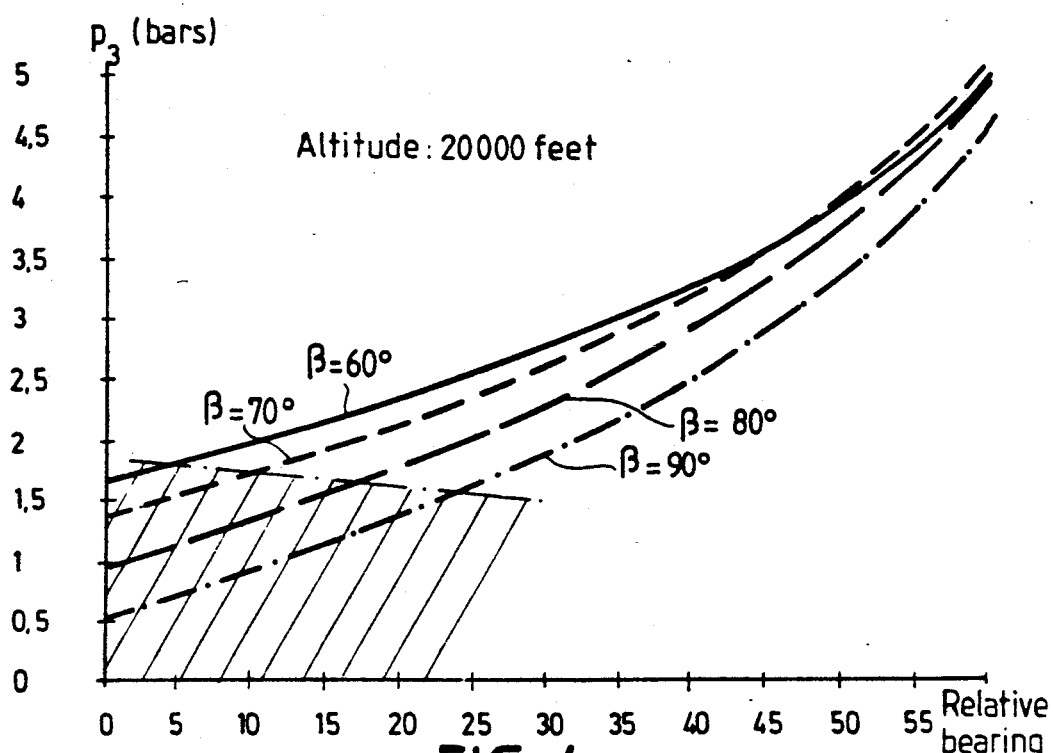
FIGS. 4 and 5 illustrate the curves of variation in the pressure necessary in the prisms associated with the lateral facets as a function of the relative bearing angles of the line of sight for two different altitudes of the carrier, respectively 20000 and 60000 feet.

FIG. 1 shows the architecture of an optoelectronic system including:

a port 1 with plane facets;
a line-of-sight orientation device 2;
an optical device 3, generally with a big focal length F,
an optical sensor 4 which, in association with the optical device, gives a high angular resolution, of the order of about ten urd.

FIG. 2 illustrates the dihedron effect of the facetted port when the field goes through a ridge between two facets of the port. The front facet 11 receives a part of the field which emerges within the orientation device as a parallel beam that is all the more deflected from the input direction as the difference between the index $n_2$ within the device and the index $n_1$ outside is greater.

In the same way, the lateral facet 12 receives the other part of the field which emerges within the line-of-sight orientation device as a parallel beam that is all the more deflected from the input direction as the difference between the index $n_2$ within the device and the index $n_1$ outside is greater.

When the aircraft is on the ground, since the internal and external pressures are identical, the indices are equal and the beam is not deflected. The two parts of the flux transmitted by the two facets emerge in parallel and there is no doubling of the image.

By contrast, when the aircraft rises in altitude, the pressures falls outside while it is kept constant within. Consequently, the image is doubled within the line-of-sight orientation device. If the distribution of the flux between the two facets is such that one of the two facets receives the greatest part of it, the effect is not very perceptible but if the flux is distributed sufficiently, the effect becomes very perceptible, all the more so as the altitude is high.

The invention proposes to make a facetted port equivalent to a plane port without modifying its external geometry.

According to a first approach, the invention uses variable index prisms instead of the lateral facets of the facetted port so as to make the rays emerging from the lateral faces parallel to those emerging from the front face. To this end, the index of the prism is automatically controlled as a function of:

the angle of the direction of the line of sight;
the external and internal temperatures;
the altitude of the carrier.

In a first variant, the method used to obtain the variable index prism consists in making a prismatic volume between two strips with parallel faces forming an angle, between them, that corresponds to the angle at the edge of the prism and in filling this volume with air or any other gas under variable and controlled pressure.

FIG. 3 gives an illustration, according to a first variant of the invention, of a method of compensating for the dihedron effect created by the facetted port during variations in altitude of the carrier. It uses a prism formed between the plane facet 12 and a second plane facet 13 inclined by an angle $\alpha$. This prism has an index $n_3$ that is variable by variation of the gas pressure in this cavity. The relationship of variation of the index, and hence of the pressure imposed on the gas, depends on variable parameters:

the inclination of the incident ray $\theta$ with respect to the port, the front facet being taken as a reference, and hence the orientation of the line-of-sight orientation, indices $n_2$ and $n_2$ and hence
  * internal temperature and pressure,
  * external temperature and pressure.

It also depends on the characteristics of the system and notably on the geometry of the port:
  * angles of inclination of the facets in relation to a reference plane, or angle $\beta$ of the dihedron formed by the front facet and a lateral facet;
  * angle $\alpha$ at the edge of the corrector prism.

The computation of the relationship of variation seeks to make the angles of the direction of the line of sight vary in the same way, in elevation and in relative bearing, for that part of the flux which is incident to the front facet and for that part of the flux which is incident to the lateral facet when the flux goes from the exterior of the aircraft to the interior of the optical sighting device.

Figure 5:
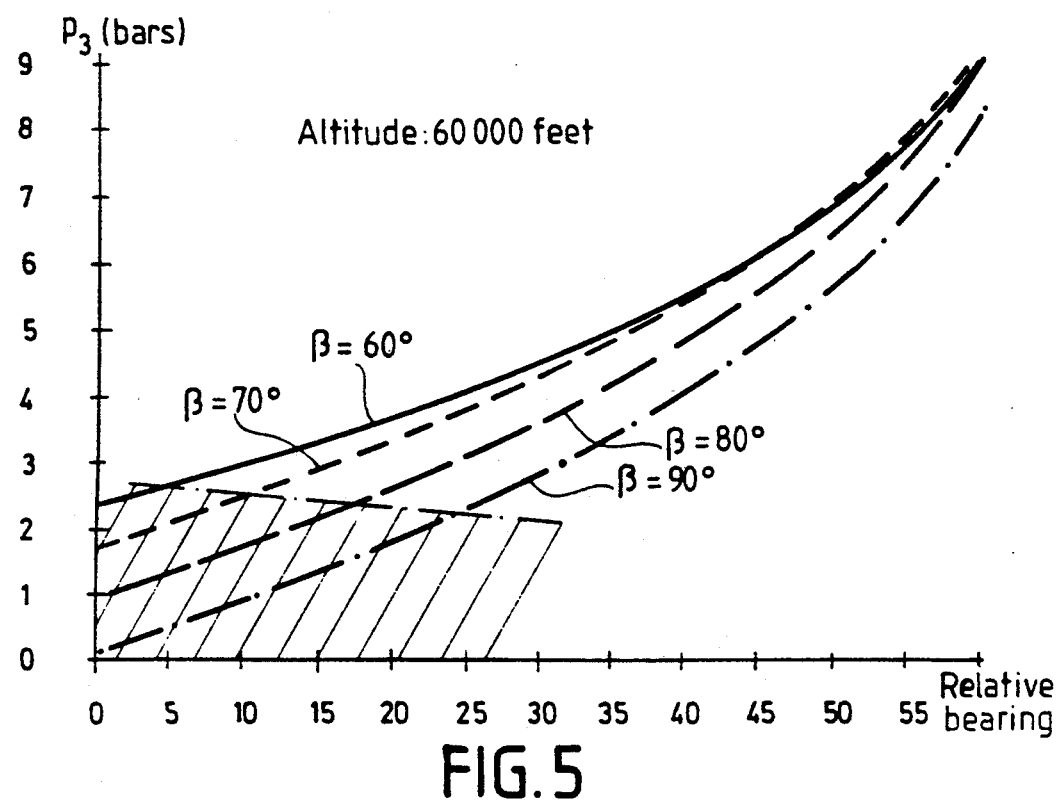

FIGS. 4 and 5 give an illustration, for one embodiment, of the curves of variation in the pressure necessary in the prism associated with the lateral facets of the port, as a function of the relative bearing angle $\theta$ of the line of sight and for two different altitudes of the carrier.

In FIG. 4, which illustrates the variation in pressure for a carrier altitude of 20000 feet, several curves have been shown, along the angle $\beta$ of the dihedron formed by the front facet and the lateral facet ($\beta = 60°, 70°, 80°, 90°$).

For $\beta = 60°$, a 45° relative bearing angle of the line of sight and an angle $\alpha = 10°$ at the edge of the prism, the pressure $p_3$ within the prism should be taken to a little over six bars.

To obtain variable pressure in the cavity, enabling the adjustment of the index $n_3$, different means can be used, notably a compressor device, or a variable volume device.

Figure 6:
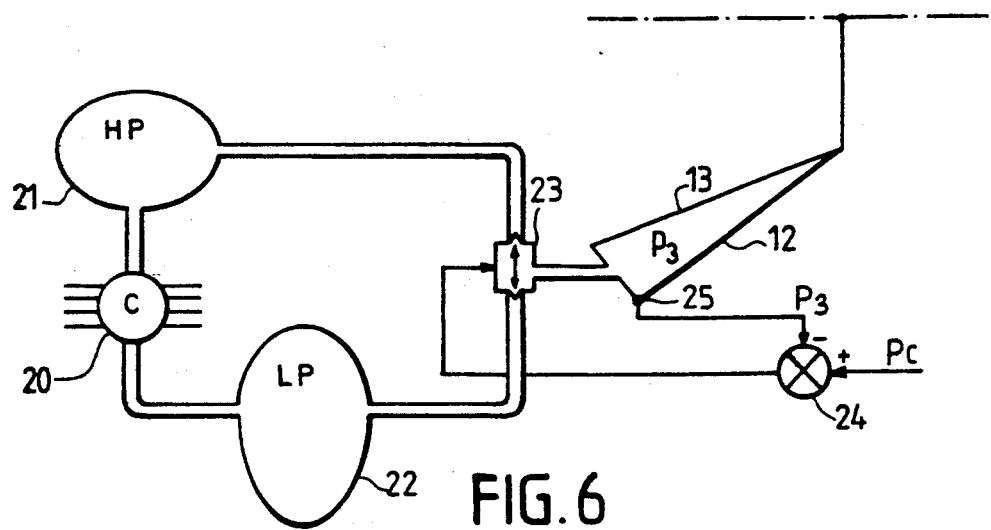
FIGS. 6 and 7 show two embodiments of the device for controlling the index of the prisms.

The first embodiment of the means for controlling the pressure variation in the prism is shown in FIG. 6. This is a device constituted by a compressor 20, a high-pressure (HP) vessel 21, and low-pressure (LP) vessel 22 and a dual-action solenoid valve 23. In the high-pressure vessel, the compressor maintains pressure that is greater than the pressure necessary in the prism (six to eight bars) and, in the low-pressure vessel, it maintains a pressure of the order of one bar or even less. The dual-action solenoid valve is automatically linked to the pressure $P_3$, which is internal to the prism, measured by a pressure sensor 25, in balancing high pressure and low pressure in order to attain the control point value pc computed on the basis of the above-described parameters. To this end, a circuit 24 computes the differential pressure between the pressure $P_3$ within the prism and the computed control point pressure pc, and actuates the solenoid valve 23. In this figure, only one of the two prisms has been shown. In practice, the line of sight determines the lateral facet that receives the field and for which a correction of the deviation has to be actuated. Consequently, the same pressure control device may be used, provided that there is provision for a junction between the output of the solenoid valve and the two prisms. The device may also be duplicated if the space occupied by it does not exceed the permitted volume.

Figure 7:
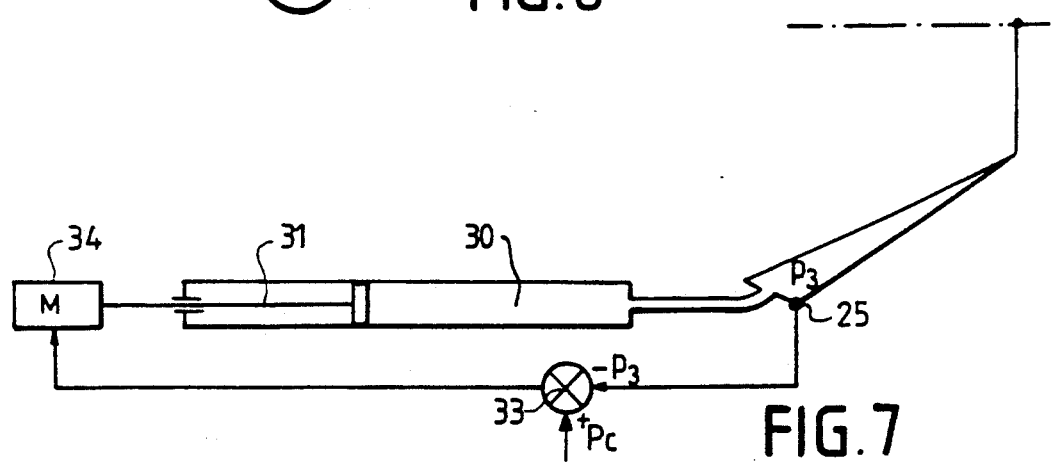

The second embodiment shown in FIG. 7 is a device formed by a compression chamber 30 and a piston 31 for the variation of the volume. The principle is based on the control of a simple variation in volume generation an inversely proportional variation in pressure, the chamber communicating with the cavity of the prism. The necessary variation in volume is of the order of zero to six times the volume of the cavity 3 of the prism. This principle may be used when the volume of the cavity is small. The pressure $p_3$ measured by the pressure sensor 25 within the prism is compared with the control point pressure in a comparator 33, the output of which is connected to an motor 34 enabling the piston to be actuated.

In a second alternative approach according to the invention, the compensation for the dihedron effect is obtained no longer by a prism but by balancing the pressure on either side of the port. In this case, the external and internal indices are equal and the rays emerging from each of the facets remain parallel.

For this purpose, since the optical device cannot tolerate any pressure variation, this pressure variation is applied in the zone behind the port including the line-of-sight orientation device. This dictates the fact that there is no refractive power within the line-of-sight orientation device. Furthermore, it is necessary to provide for imperviousness between this zone, the pressure of which varies with the external pressure, and the zone of the optical device in which the pressure should be kept constant.

Figure 8:
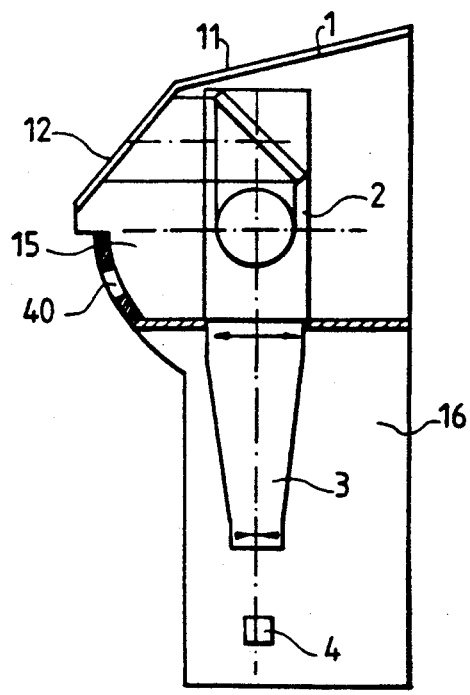
FIG. 8 shows a facetted port, according to a second variant of the invention, compensated by the balancing of the pressures on either side.

With these conditions fulfilled, it is necessary to have clean and dry air at the depressurized zone. This is because of the mirrors, mechanisms and driving systems needed for the line-of-sight orientation device. According to an embodiment shown in FIG. 8, the system has an air exchanger device, provided with a desiccator, enabling a system to "breathe" in giving the air from the system when the external pressure is lower than the internal pressure of the system, the phenomenon being reversed in the opposite case. The advantage of this device is that it automatically regenerates a desiccator that carries out the necessary drying of the air entering the system. The device is produced by the firm DACO in the United States. In FIG. 8, the system shown has a transparent and impervious separation between the zone 15, located behind the facetted port 1 and including the line-of-sight orientation device 2 which, from the optical point of view, has only plane mirrors, and the zone 16 of the optical device 3 kept at constant pressure. The air-exchanger device 40 is set up on the wall of the zone 15. This air-exchanger device 40 balances the pressure within the zone 15 and the external pressure. Thus, the external parallel beam remains parallel after it has passed through the facetted port, irrespectively of the altitude of the carrier. Instead of being placed directly on the wall of the zone 15, the air-exchanger device 40 may be off-set and connected by a flexible tube communicating with the interior of the port.

The invention is not restricted to the embodiments that have been specifically described and shown.

In particular, the prisms formed on the lateral facets of the facetted port have been described above as cavities filled with a gas for which the pressure, and hence the index of the prism, are made to vary. This arrangement is not restrictive. It would be quite possible to use a prism formed by a material with a variable index, should there be such a material having suitable optical qualities, notably transparency, insofar as the controllable (for example electrically controllable) index variation is sufficient to enable the correction of the above-described effect. Most of the materials with variable index are generally not transparent enough and are polarized. This means that they let through only half of the flux.

For the range of variation as much as for the variation speed, although it is not necessary to follow exactly all the variations in the line of sight or in the altitude of the carrier, irrespectively of their amplitudes, the different means must be chosen as a function of the index variation range.

Since the goal is the quality of the final image, it is possible to tolerate small variations without correcting them, or to actuate the variation only when the index variation to be actuated, namely the pressure variation, exceeds a certain threshold.

In the same way, the sett-point value may be modified by stages, for it is not necessary to keep the internal and external indices at strictly identical values. Small deviations may be perfectly well tolerated if they do not have an impeding effect on the image quality.

Finally, the speed of the correction itself is not an essential criterion either. The line of sight may be made to vary swiftly (one radian per second for example) if a different zone is aimed at. This could necessitate a pressure variation of six bars within the prism. However, this variation does not need to follow the line of sight variation with the closest precision. It is quite possible for it to occur with a certain delay.

Besides, as regards the choice of the angle at the edge of the prisms, α equal to 10° in the example given above, its value may be modified, either to be compatible with the possible pressure variations owing to the constraints dictated by the means for controlling the pressure variation, or to increase the possible range of variation. Thus, an angle $\alpha = 10°$ at the edge of the prism may correspond to a pressure variation of six bars between altitudes of 0 and 60000 feet for example, all the other parameters (for example the line of sight) being kept constant while a prism with an angle of 5° at the edge would require a pressure variation of 20 bars for example for the same variation in altitude of the carrier.

It is also possible to make a correction only when, for example, more than 20% of the flux of the field of sight passes through one of the lateral facets. Indeed, beneath this threshold, since the major part of the flux goes through the front facet, the image formed out of this part of the flux is not significantly doubled owing to the other part of the flux emerging in a different direction.

Nor is the invention restricted to ports having three facets. It is applicable irrespectively of their number.

What is claimed is:

1. An airborne optoelectronic identification and/or localization system comprising a facetted port, a line-of-sight orientation device and an optical device for the forming of images of the viewed field, wherein said system further includes compensation means to bring the flux emerging from a lateral facet of the port and the flux emerging from the front facet in a parallel condition within the line-of-sight orientation device.

2. A system according to claim 1, wherein the compensation means include a prism with controllable index formed between each lateral facet and a plane face, means for determining the variation in index to be applied chiefly as a function of the altitude of the carrier and the direction of orientation of the line of sight, and means to control the index on the basis of the determined variation in index.

3. A system according to claim 2, wherein the prisms with controllable index are gas-filled cavities, associated with means to control the pressure within the cavities, means to determine the index variation actuating the transmission of a control point pressure to a comparator further receiving the value of pressure in the prism, the output of the comparator being connected to pressure variation control means.

4. A system according to claim 3, wherein the pressure variation control means include a compressor connected to two vessels, respectively a low-pressure vessel and a high-pressure vessel, coupled to a dual-action solenoid valve, itself coupled to the cavities forming prisms with variable index.

5. A system according to claim 3, wherein the pressure variation control means include a chamber associated with a piston and coupled to the cavity of the prisms, a comparator of the control point pressure and of the pressure within the prism, the output of the comparator controlling a motor coupled to the piston to cause variation of the volume and hence of the pressure in the chamber and in the cavities of the prisms.

6. A system according to claim 1, wherein the compensation means include an air exchanger communicating with the interior of the port, and wherein the line-of-sight orientation device has no refractive power and is separated from the optical image forming device by an impervious and tranparent port, this exchanger enabling the pressure, and hence the index within the orientation device, to be kept equal to the external index.

* * * * *